United States Patent Office 3,388,169
Patented June 11, 1968

3,388,169
STABILIZATION OF POLYOXYALKYLENE COMPOUNDS
John E. Tyre, South Charleston, and Friso G. Willeboordse, St. Albans, W. Va., assignors to Union Carbide Corporation, a corporation of New York
No Drawing. Filed Nov. 29, 1963, Ser. No. 327,046
1 Claim. (Cl. 260—611.5)

ABSTRACT OF THE DISCLOSURE

An additive system consisting of 2,2'-methylene bis(4-methyl - 6 - tertiarybutylphenol) and 2,6 - ditertiary butyl paracresol for polyoxyalkylene compounds to render the polyol compound singularly resistant to oxidation.

This invention relates to a process for the stabilization of polyoxyalkylene compounds against oxidation. More particularly the instant invention relates to a polyoxyalkylene composition having incorporated therein a stabilizing amount of an additive system which operates in a synergistic manner to inhibit oxidative degradation.

Polyoxyalkylene compounds in general, are well known to the art, and find suitable utilization in a number of diverse applications. By way of illustration such compounds are frequently employed as emulsifiers, synthetic lubricants, hydraulic fluids, plasticizers, detergents, heat transfer liquids, and the like. Disadvantageously, however, these compounds are readily subject to oxidative decomposition or degradation upon prolonged exposure to air. In such compounds chemical breakdown resulting from oxidation is ordinarily evidenced: (a) by an increase in the saponification number of the compound (b) by the development of an "aldehydic" odor and bitter taste and (c) by an increase in the "sulfuric acid test color" of the compound, i.e., the color developed upon reaction thereof with concentrated sulfuric acid. Moreover, in higher molecular weight polyoxyalkylene compounds, viz. compounds having an average molecular weight in excess of approximately 4,000, a substantial decrease in the average molecular weight and in viscosity also occurs, accompanied in many instances by a change from solid to liquid state. As a consequence of this susceptibility to oxidation, many possibilities of use for polyoxyalkylene compounds unfortunately are precluded.

It has heretofore been disclosed that monocyclic alkyl phenols such as 2,6-ditertiarybutyl paracresol are effective as antioxidants for polyoxyalkylene compounds. Although these compounds perform admirably at temperatures of 100° C. or less, it has been found that at temperatures in excess of about 110° C. that the 2,6-ditertiarybutyl paracresol is virtually ineffective to prevent oxidative breakdown. In fact at temperatures of approximately 135° C., the polyoxyalkylene composition stabilized with 2,6-ditertiarybutyl paracresol demonstrates an oxidative stability not appreciably greater than that of the polyoxyalkylene compound alone.

The term "polyoxyalkylene compound" as used herein is meant to describe those compounds prepared by the reaction of an alkylene oxide with either water or an aliphatic mono-, di-, or polyhydric alcohol. One major group of polyoxyalkylene compounds include those characterized by repeating 1,2-alkyleneoxy units of the general formula of

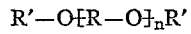

wherein $n$ indicates the number of operating alkyleneoxy units and wherein R is an alkylene radical containing from 2 to 4 carbon atoms such as ethylene, 1,2-propylene, 1,3-propylene, 2,3-butylene, 1,2-butylene, and 1,4-butylene, and R' represents hydrogen and acyl or alkyl group. The polyoxyalkylene compounds wherein R is a 1,2-alkylene group are most common. Illustrative of the "polyoxyalkylene compounds" within this invention are those compounds prepared by the reaction of a 1,2-alkylene oxide with either water or an aliphatic mono-, di-, tri-, or polyhydric alcohol. This class of compounds includes the polyalkylene glycols such as polyethylene glycol, polypropylene glycol, poly(mixed oxyethylene oxypropylene) glycol, the polyoxybutylene glycols including polybutylene glycols prepared from 3,4-epoxybutane, 2,3-epoxybutane, and poly(oxy-1,4-butylene)glycol prepared from tetrahydrofuran. Also included are polyhydroxy, the ethylene oxide and propylene oxide adducts of polyfunctional alcohols and of polyfunctional amines such as pentaerythritol, glycerol, mannitol, sorbitol, 2,2,6,6-tetrakis(hydroxytriethyl)cyclohexanol, ethylene diamine, triethanolamine and the like. Other useful polyoxyalkylene compounds which may be advantageously stabilized in accordance with the instant invention are the monoalkyl ethers of such as polyethylene glycol monomethyl ether, polypropylene glycol monobutyl ether, the monooctyl ethers of poly(mixed oxyethylene oxypropylene) glycols, the dialkyl ethers of polyalkylene glycols such as the diethyl ethers of polypropylene glycol, the butyl ethers of methoxy polyethylene glycol, and the like, the ether esters of polyalkylene glycols such as the butyl ethers of polyethylene glycol maleate, the ethyl ethers of polypropylene glycol acetate, and the diesters of polyalkylene glycols such as the di-2-ethylhexanoate of poly(mixed oxyethylene oxypropylene) glycol.

This class of compounds includes the simple polyoxyalkylene compounds such as diethylene glycol, tetraethylene glycol as well as high molecular weight polyoxyalkylene compounds having molecular weights up to about 6000. The polyoxyalkylene compounds and the methods for their preparation are more explicitly disclosed in U.S. Patents Nos. 2,293,868; 2,425,755; 2,425,845; 2,448,664; 2,520,611 and 2,520,612.

Thus, in accordance with this invention a singularly efficacious synergistic action is exploited to impart increased oxidative stability to polyoxyalkylene compounds particularly at high temperatures. Although 2,6-ditertiarybutyl paracresol is all but ineffective at temperatures greater than about 110° C., it has been found that a high degree of oxidative stability may be achieved by addition to a polyoxyalkylene compound of synergistic additive system consisting of 2,6-ditertiarybutyl paracresol and 2,2'-methylene bis(4-methyl-6-tertiarybutylphenol). The effect of addition of such a system is to impact an unexpectedly high degree of stability which is superior to that obtainable by 2,6-ditertiarybutyl paracresol alone, and in fact is, by more than twice that obtainable using 2,2-methylene bis(4-methyl-6-tertiary butyl phenol). Thus particularly in view of the ineffectiveness of 2,6-ditertiarybutyl paracresol, this data is indeed surprising.

The additive system of this invention is preferably employed in small amounts sufficient to impart improved oxidative stability. Normally, the additive composition is employed in amounts ranging from 500 to about 5,000 parts per million by weight based upon the polyoxyalkylene compound. Neither of the individual antioxidants are commonly employed in great preponderance with respect to the other in any particular composition. The percentage of each antioxidant may range from about 200 to about 3000 parts per million based upon the polyol.

The method of introduction of the novel additive system to the polyoxyalkylene compounds is not critical and simple addition with stirring will suffice. In the event that heating is required to solubilize the additives, the addition is advantageously carried out under a nitrogen atmosphere to preclude any unnecessary oxidation of the polyoxyalkylene compound.

The oxidative stability of the polyoxyalkylene compound was evaluated by placing a sample of the polyoxyalkylene compound in an oxidation bomb. The bomb is then charged with pure oxygen to a predetermined pressure so that the atmosphere above the polyoxyalkylene compound is pure oxygen. The bomb is placed in a constant temperature bath and the oxygen pressure drop within the bomb is then recorded at subsequent time intervals. This drop in oxygen pressure above the polyoxyalkylene compound is thus an effective parameter for measuring the amount of oxygen pressure which takes place.

In the following tests in each instance a 75 gram sample of polyoxyalkylene compound was charged to the bomb under a pressure of 100 pounds per square inch gauge of oxygen. Readings of the pressure were taken at hourly intervals and the residual pressure as a percentage of original pressure was computed. The results tabulated in Table I were obtained comparing A. Unstabilized polyoxyalkylene compound
B. Polyoxyalkylene compound+500 p.p.m. 2,6-ditertiarybutyl paracresol
C. Polyoxyalkylene compound+500 p.p.m. 2,2′-methylene bis(4-methyl-6-tertiarybutylphenol)
D. Polyoxyalkylene compound+500 p.p.m. 2,6-ditertiarybutyl paracresol+500 p.p.m. 2,2′-methylene bis(4-methyl-6-tertiarybutylphenol)

It will be noted that the polyoxyalkylene compound stabilized with 500 parts per million 2,6-ditertiarybutyl paracresol is somewhat more stable than the polyoxyalkylene compound without any stabilizers. However, to effectively demonstrate the superior results obtained using the catalyst system of the instant invention, values representing the arithmetic sum of the results obtained with 500 parts per million of each of the antioxidants (i.e., arithmetic sum of systems B and C) has been computed. That is, if the residual pressures were plotted as a function of time for both system B and system C, the sum of the two curves on the direction of the time axis would be the arithmetic sum. The effect achieved by employing 500 parts per million of each antioxidant (System D) is greater than that of the sum of the two by a considerable amount. The unexpected effect is heightened since actually the incremental increase in stability which is anticipated by use of 2,6-ditertiarybutyl cresol would be the difference between systems A and B. Thus the sum of the values of systems B and C give the best possible projection result which could be anticipated.

In the tests tabulated in Table I the polyol in all instances was a polyoxyalkylene glycol, viz. the propylene oxide adduct of glycerol having a hydroxy number of 56.

TABLE I.—COMPARATIVE OXIDATIVE STABILITY BY OXYGEN BOMB TEST
Residual oxygen pressure in percent of original pressure

| Time, in hours | A<br>Unstabilized Polyol | B<br>Polyol+<br>500 p.p.m. 2,6-ditertiarybutyl paracresol | C<br>Polyol+<br>500 p.p.m. 2,2′-methylene bis(4-methyl-6-tertiarybutylphenol) | Arithmetic Sum of B+C | D<br>Polyol+<br>500 p.p.m. 2,6-ditertiarybutyl paracresol+<br>500 p.p.m. 2,2′-methylene bis-(4-methyl-6-tertiarybutyl-phenol) |
|---|---|---|---|---|---|
| 1 | 77 | 97 | 99 | 100 | 100 |
| 2 | 39 | 89 | 93 | 99 | 100 |
| 3 | 26 | 71 | 85 | 98 | 100 |
| 4 |  | 56 | 76 | 94 | 98 |
| 5 |  | 41 | 64 | 88 | 95 |
| 6 |  | 33 | 56 | 82 | 90 |
| 7 |  | 29 | 47 | 75 | 83 |
| 8 |  |  | 40 | 67 | 74 |
| 9 |  |  | 36 | 61 | 68 |
| 10 |  |  |  | 55 | 61 |
| 11 |  |  |  | 50 | 54 |

To give a more graphic analysis using numerical data in approach is employed similar to that utilized in explosives research as described in The Science of High Explosives, M. A. Cook, A.C.S. Monograph Series No. 139, Reinhold, New York, p. 176 ff. (1958). There is a fundamental similarity in the decomposition of explosive materials inhibited by stabilizers and the deterioration of polyols inhibited by antioxidants, because in both types of reaction the radical creating propagation step is inhibited more successfully in the beginning than subsequently in time. Once the decomposition has started fully, there is a sharp, approximately linear decrease in pressure with time. By extrapolating this essentially linear portion of the curve, (i.e., by drawing a tangent to the curve) back to a point of 100 percent pressure the time at which the effectiveness of the antioxidant begins to fail. This value obtained by extrapolating to the point of 100 percent pressure is called $t_0$, or the time at which the pressure loss is effectively zero. Likewise at the points of 90 percent of original pressure, 80 percent of original pressure, 70 percent of original pressure, and 60 percent of original pressure, the values of $t_{10}$, $t_{20}$, $t_{30}$ and $t_{40}$ are obtained. These values give a graphic picture of the time at which oxidative degradation begins ($t_0$), as well as the number of hours before each system experiences a 10 percent, 20 percent, 30 percent or 40 percent pressure drop. The $t_0$ through $t_{40}$ values are tabulated in Table II. The values reported have been obtained from the data reported in Table I.

TABLE II.—T VALUES
Comparative oxidative stability by oxygen bomb test

|  | A<br>Unstabilized Polyol | B<br>Polyol+<br>500 p.p.m. 2,6-ditertiarybutyl paracresol | C<br>Polyol+<br>500 p.p.m. 2,2′-methylene bis(4-methyl-6-tertiarybutylphenol) | Arithmetic Sum of B+C | D<br>Polyol+<br>500 p.p.m. 2,6-ditertiarybutyl paracresol+<br>500 p.p.m. 2,2′-methylene bis-(4-methyl-6-tertiarybutyl-phenol) |
|---|---|---|---|---|---|
| $t_0$ | 0.4 | 1.0 | 2.0 | 3.0 | 4.8 |
| $t_{10}$ | 0.7 | 1.8 | 2.8 | 4.6 | 6.0 |
| $t_{20}$ | 0.9 | 2.5 | 3.6 | 6.1 | 7.4 |
| $t_{30}$ | 1.2 | 3.2 | 4.3 | 7.5 | 8.8 |
| $t_{40}$ | 1.4 | 3.9 | 5.2 | 9.1 | 10.2 |

It will be noted that the $t_0$ values for the system is not only greater than the sum of the $t_0$ values of the system employing the antioxidants individually, but is also greater than twice the $t_0$ value of the 2,2'-methylene bis(4-methyl-6-tertiarybutyl phenol) which is the more effective antioxidant employed alone. This analysis points up the unexpected results obtained using the novel additive system of the instant invention.

What is claimed is:

1. A composition resistant to oxidative degradation comprising the propylene oxide adduct of glycerol and from 500 to 5000 parts per million by weight based on the propylene oxide adduct of glycerol of an additive system consisting of 2,2'-methylene bis(4-methyl-6-tertiarybutylphenol) and 2,6-ditertiarybutyl-paracresol, wherein each member of the additive system is present in an amount of from about 200 to about 3000 parts per million by weight based upon said propylene oxide adduct of glycerol.

References Cited

UNITED STATES PATENTS

| | | | |
|---|---|---|---|
| 2,942,033 | 9/1960 | Leis et al. | 260—611.5 |
| 3,144,431 | 8/1964 | Dolce et al. | 260—611.5 |

OTHER REFERENCES 748,856   5/1956   Great Britain.

BERNARD HELFIN, *Acting Primary Examiner.*

UNITED STATES PATENT OFFICE
CERTIFICATE OF CORRECTION

Patent No. 3,388,169            June 11, 1968

John E. Hyre et al.

It is certified that error appears in the above identified patent and that said Letters Patent are hereby corrected as shown below:

In the heading to the printed specification, line 4, "John E. Tyre" should read -- John E. Hyre --.

Signed and sealed this 11th day of November 1969.

(SEAL)
Attest:

Edward M. Fletcher, Jr.
Attesting Officer

WILLIAM E. SCHUYLER, JR
Commissioner of Patents